US012145365B2

(12) United States Patent
Aoki et al.

(10) Patent No.: US 12,145,365 B2
(45) Date of Patent: Nov. 19, 2024

(54) LIQUID EJECTING HEAD AND LIQUID EJECTING APPARATUS

(71) Applicant: SEIKO EPSON CORPORATION, Tokyo (JP)

(72) Inventors: Takashi Aoki, Shiojiri (JP); Shohei Mizuta, Matsumoto (JP)

(73) Assignee: SEIKO EPSON CORPORATION (JP)

(*) Notice: Subject to any disclaimer, the term of this patent is extended or adjusted under 35 U.S.C. 154(b) by 150 days.

(21) Appl. No.: 17/898,593

(22) Filed: Aug. 30, 2022

(65) Prior Publication Data

US 2023/0066192 A1 Mar. 2, 2023

(30) Foreign Application Priority Data

Aug. 31, 2021 (JP) ................................ 2021-140979

(51) Int. Cl.
*B41J 2/14* (2006.01)

(52) U.S. Cl.
CPC ................................ *B41J 2/14233* (2013.01)

(58) Field of Classification Search
CPC ........ B41J 2/161; B41J 2/1623; B41J 2/1626; B41J 2/1631; B41J 2/1635; B41J 2/14201; B41J 2/14233; B41J 2/14274; B41J 2002/14241; B41J 2002/14266; B41J 2002/1425
See application file for complete search history.

(56) References Cited

U.S. PATENT DOCUMENTS

| | | | | |
|---|---|---|---|---|
| 6,502,928 | B1 * | 1/2003 | Shimada | B41J 2/1646 347/68 |
| 2003/0117041 | A1 * | 6/2003 | Kurihara | B41J 2/161 257/E27.006 |
| 2006/0038859 | A1 | 2/2006 | Sugahara | |
| 2014/0362142 | A1 | 12/2014 | Takaai et al. | |

FOREIGN PATENT DOCUMENTS

| | | |
|---|---|---|
| JP | 2004-166463 A | 6/2004 |
| JP | 2015-042482 A | 3/2015 |

* cited by examiner

*Primary Examiner* — Kristal Feggins
(74) *Attorney, Agent, or Firm* — Harness, Dickey & Pierce, P.L.C.

(57) ABSTRACT

A liquid ejecting head includes a pressure chamber substrate in which wall surface portions of a pressure chamber are formed, an diaphragm that forms a top surface portion of the pressure chamber, a piezoelectric element that is provided on the diaphragm, and a communication plate, in which an upper surface of the communication plate is bonded to a lower surface of the pressure chamber substrate by an adhesive, the upper surface of the communication plate is provided with a supply opening and a discharge opening, the pressure chamber is longitudinal in an X direction, acute angle portions are formed by the wall surface portions that mutually form an acute angle at each end in the X direction of a bottom surface portion of the pressure chamber, and the acute angle portions do not overlap with the supply opening and the discharge opening in a laminating direction.

18 Claims, 10 Drawing Sheets

LIQUID EJECTING HEAD AND LIQUID EJECTING APPARATUS

The present application is based on, and claims priority from JP Application Serial Number 2021-140979, filed Aug. 31, 2021, the disclosure of which is hereby incorporated by reference herein in its entirety.

BACKGROUND

1. Technical Field

The present disclosure relates to a liquid ejecting head and a liquid ejecting apparatus.

2. Related Art

JP-A-2015-42482 describes a liquid ejecting head that ejects a liquid from a nozzle by a pressure change in a pressure chamber. The liquid ejecting head includes a pressure chamber substrate and a communication plate, and the pressure chamber is formed by laminating these substrates. In addition, the top surface of the pressure chamber is provided with an diaphragm that is displaced according to variation of a piezoelectric element. The pressure chamber substrate is, for example, manufactured by performing wet etching on a silicon single crystal substrate whose surface is a (110) plane. Accordingly, the shape of the pressure chamber is a parallelogram when viewed in the laminating direction, and two acute angle portions are formed at corners on a diagonal line of the parallelogram. On the communication plate, an individual communication hole that supplies a liquid to the pressure chamber and a nozzle communication hole that discharges the liquid toward a nozzle from the pressure chamber are formed. The pressure chamber substrate and the communication plate are bonded together using a liquid adhesive.

However, in the liquid ejecting head described in JP-A-2015-42482, breakage of the diaphragm may be caused by the adhesive. Specifically, in the bonding process of the pressure chamber substrate and the communication plate, a part of the adhesive escapes from a bonding surface, enters the pressure chamber from the two acute angle portions formed in the pressure chamber, and flows along the boundary of each surface constituting the pressure chamber by a capillary force. In addition, a part of the adhesive that has escaped flows toward the communication plate side from the individual communication hole and the nozzle communication hole. In this way, since the flow path of the adhesive diverges into many branches, the amount of adhesive attached to the diaphragm near the piezoelectric element is likely to become uneven. As a result, when the piezoelectric element is driven, the load concentrates on a part of the diaphragm, and the diaphragm sometimes breaks.

SUMMARY

The present disclosure is a liquid ejecting head including a pressure chamber substrate in which wall surface portions of a pressure chamber in communication with a nozzle are formed, an diaphragm that is provided on a first surface side of the pressure chamber substrate in a laminating direction and forms a top surface portion of the pressure chamber, a piezoelectric element that is provided on the diaphragm, and a communication plate that is provided on a second surface side opposite to the first surface of the pressure chamber substrate in the laminating direction and forms a bottom surface portion of the pressure chamber, in which a third surface of the communication plate is bonded to the second surface of the pressure chamber substrate by an adhesive and forms the bottom surface portion, the third surface is provided with a supply opening that supplies a liquid to the pressure chamber and a discharge opening that guides a liquid in the pressure chamber to the nozzle, the pressure chamber is longitudinal in a first direction when viewed in the laminating direction, at one end of the bottom surface portion in the first direction, a first acute angle portion is formed by the wall surface portions that mutually form an acute angle, at another end of the bottom surface portion in the first direction, a second acute angle portion is formed by the wall surface portions that mutually form an acute angle, the first acute angle portion does not overlap with the supply opening and the discharge opening when viewed in the laminating direction, and the second acute angle portion does not overlap with the supply opening and the discharge opening when viewed in the laminating direction.

A liquid ejecting apparatus includes the above-described liquid ejecting head.

DESCRIPTION OF EXEMPLARY EMBODIMENTS

Hereinafter, a first embodiment will be described with reference to the accompanying drawings. Although various limitations are imposed on the embodiments described below as preferable examples, as long as there is no description to limit the present disclosure in particular in the following description, the present disclosure is not limited to these embodiments. In addition, in the following description, a printer mounted with an ink jet type liquid ejecting head is exemplified as a liquid ejecting apparatus.

Figure 1:
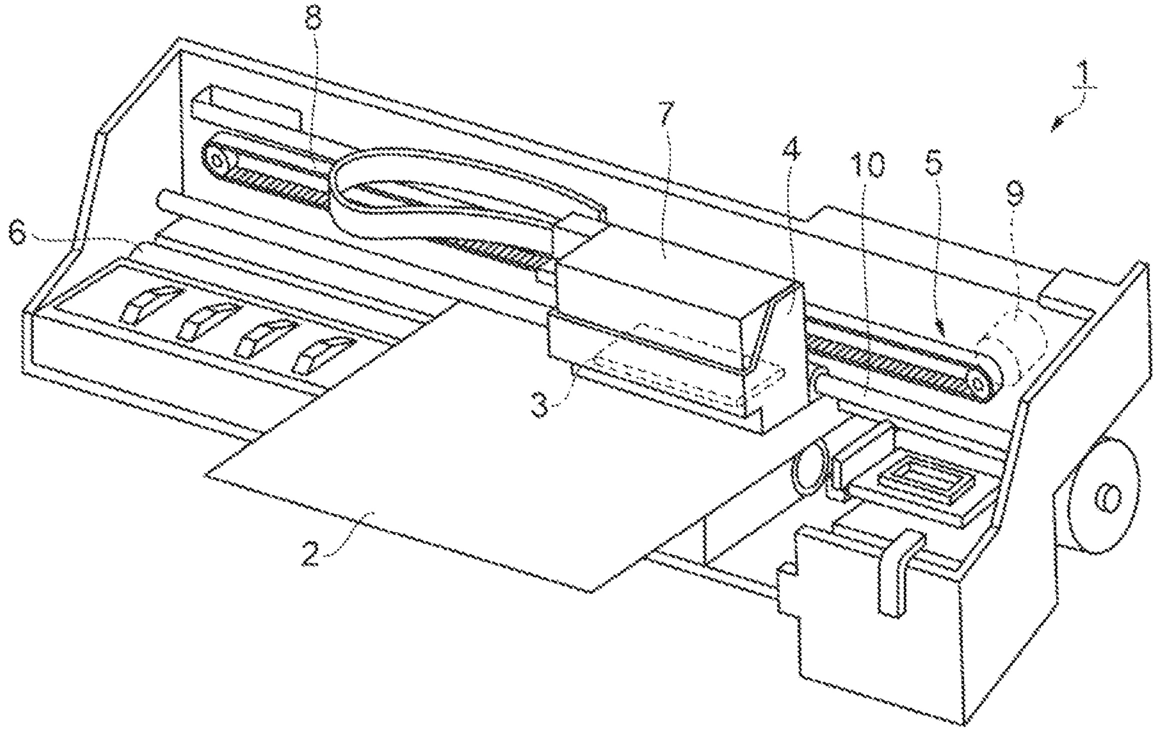
FIG. 1 is a perspective view explaining a configuration of a printer.

The configuration of a printer 1 will be described with reference to FIG. 1. The printer 1 is an apparatus that performs printing of an image or the like by ejecting ink, which is a liquid, on a surface of a recording medium 2 such as recording paper. The printer 1 includes a recording head 3 as a liquid ejecting head that ejects ink, a carriage 4 on which the recording head 3 is mounted, a carriage moving mechanism 5 that moves the carriage 4 in a main scanning direction, a platen roller 6 that transports the recording medium 2 in a sub-scanning direction, and the like. The above-described ink is stored in an ink cartridge 7 serving as a liquid supply source. The ink cartridge 7 is detachably attached to the carriage 4. Note that a configuration in which the ink cartridge 7 is disposed on the main body side of the printer 1, that is, a position away from the carriage 4, and ink is supplied to the recording head 3 through an ink supply tube from the ink cartridge 7 can also be adopted.

The above-described carriage moving mechanism 5 includes a timing belt 8. The timing belt 8 is driven by a pulse motor 9 such as a DC motor. Accordingly, when the pulse motor 9 operates, the carriage 4 is guided by a guide rod 10 installed in the printer 1 and reciprocates in the main scanning direction.

Figure 2:
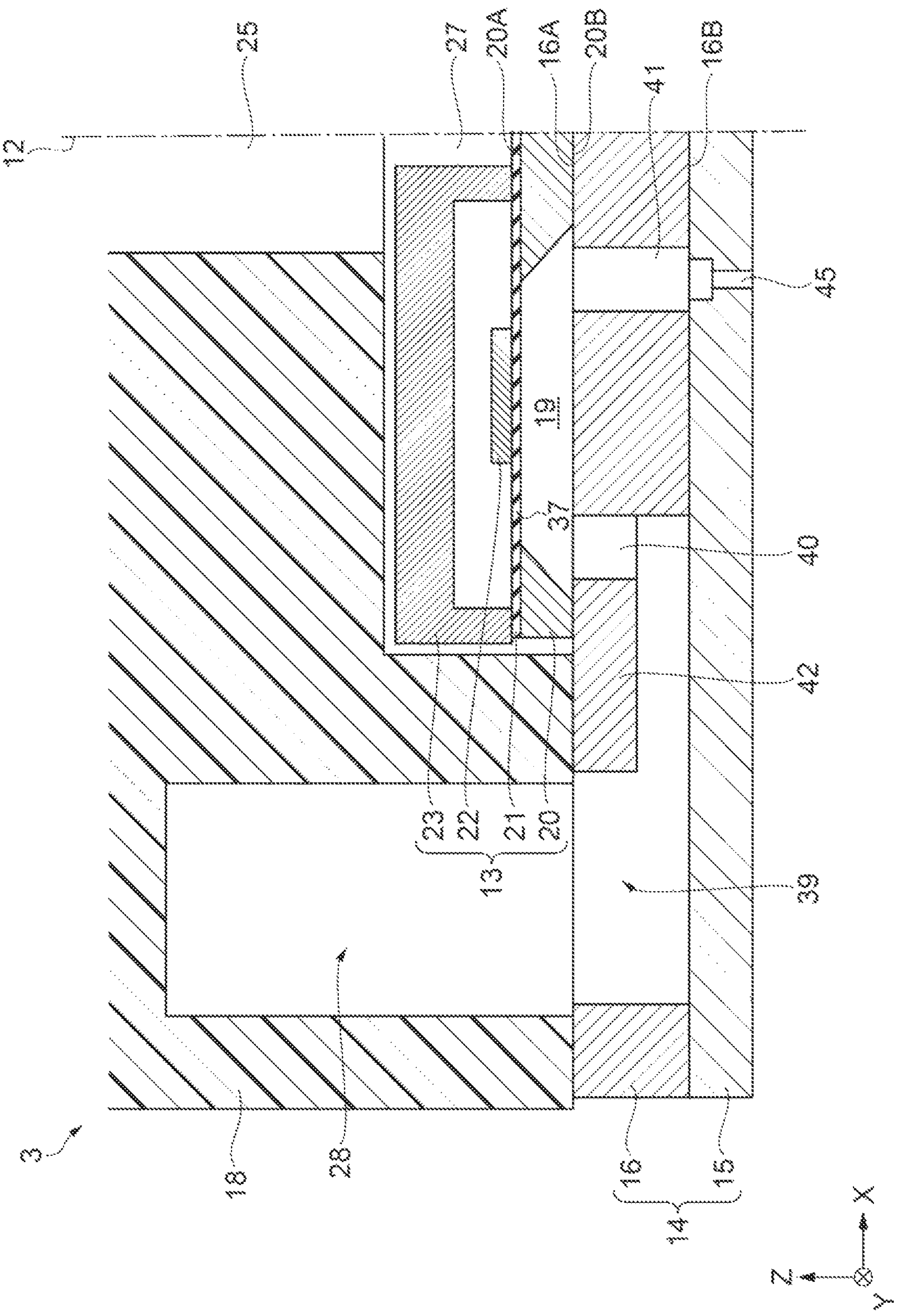
FIG. 2 is a cross sectional view of a recording head.
Figure 3A:
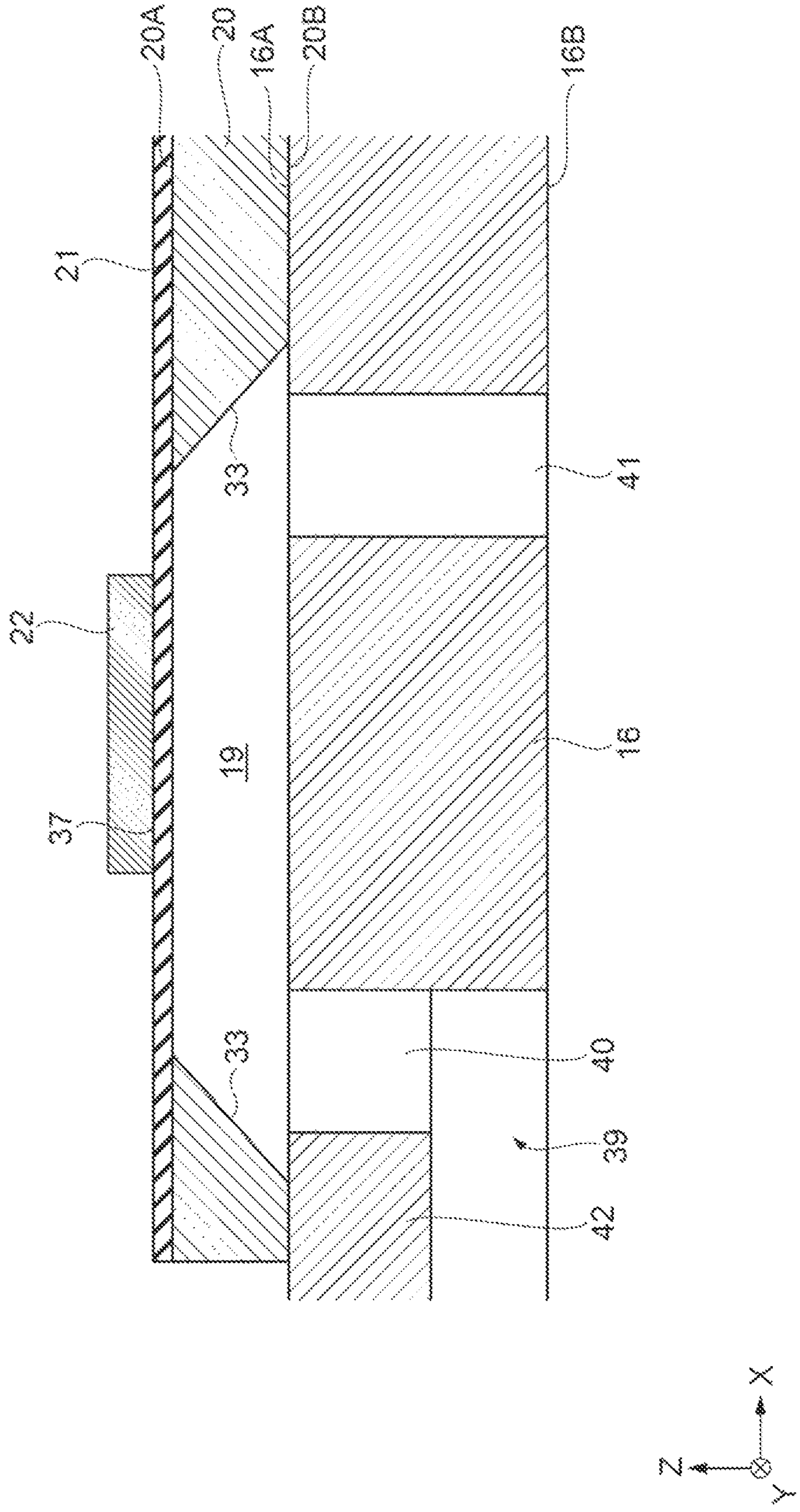
FIG. 3A is a cross sectional view enlarging a main part of the recording head.
Figure 3B:
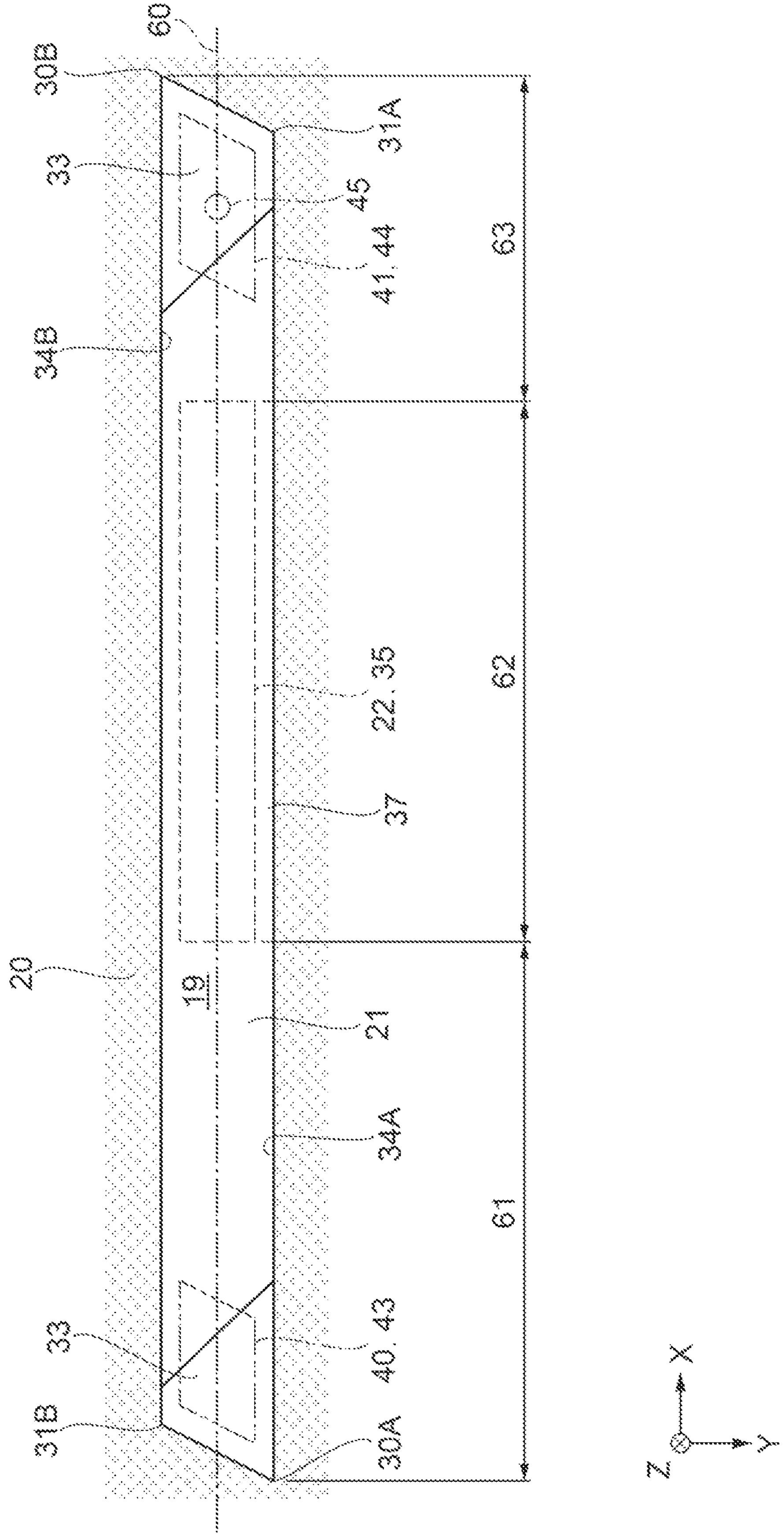
FIG. 3B is a bottom view enlarging a main part of a pressure chamber substrate.

Next, the recording head 3 will be described. FIG. 2 is a cross sectional view of the recording head 3. In addition, FIG. 3A is a cross sectional view enlarging a main part of the recording head 3, and FIG. 3B is a bottom view enlarging a main part of a pressure chamber substrate 20 constituting the recording head 3. Note that since the recording head 3 has a symmetrical configuration with respect to a central line 12 in FIG. 2, the configuration on the right side of the central line 12 is omitted in FIG. 2. Hereinafter, the horizontal direction is referred to as X direction in FIG. 2, the depth direction is referred to as Y direction, and the vertical direction is referred to as Z direction. These directions intersect with each other and are orthogonal to each other in the present embodiment. Note that the X direction corresponds to a first direction, the Y direction corresponds to a second direction, the Z direction corresponds a laminating direction. In addition, viewing in the Z direction is referred to as "in plan view". In addition, in FIG. 3B, an individual communication hole 40, a nozzle communication hole 41, and a nozzle 45 that overlap with a pressure chamber 19 in the Z direction are expressed by two-dot lines.

As illustrated in FIG. 2, the recording head 3 in the present embodiment includes a pressure generating unit 13 and a flow path unit 14, and these members are attached to a case 18 while being laminated in the Z direction. The flow path unit 14 has a nozzle plate 15 and a communication plate 16. In addition, the pressure generating unit 13 is made into a unit in which a pressure chamber substrate 20 with the pressure chamber 19 formed inside, an diaphragm 21, a piezoelectric element 22, and a protection substrate 23 are laminated.

The case 18 is a box-shaped member made of a synthetic resin and the communication plate 16, to which the pressure generating unit 13 is bonded, is fixed on the bottom surface side. In the central portion of the case 18 in plan view, a penetrating hollow portion 25 having an elongated rectangular opening in the Y direction is formed while penetrating the case 18 in the Z direction. In the penetrating hollow portion 25, one end portion of a head cable (not illustrated) is accommodated. In addition, on the lower surface side of the case 18, an accommodating hollow portion 27 recessed in a rectangular parallelepiped shape from the lower surface to the middle of the case 18 in the Z direction is formed. In the accommodating hollow portion 27, the pressure generating unit 13 is accommodated. Moreover, in the case 18, an ink introduction path 28 is formed. The ink introduction path 28 is a flow path whose lower end is in communication with a common liquid chamber 39 of the communication plate 16 described later and introduces ink from the ink cartridge 7 to the common liquid chamber 39. As described later, in the nozzle plate 15 in the present embodiment, two nozzle lines, each of which includes a plurality of nozzles 45, that eject ink are formed in the Y direction, and the ink introduction path 28 is provided for each ink line.

The pressure chamber substrate 20, which is a constituting member of the pressure generating unit 13, is manufactured from a silicon single crystal substrate. In the pressure chamber substrate 20, a plurality of the pressure chambers 19 in communication with the nozzles 45 is formed in correspondence with each nozzle 45 of the nozzle plate 15. In the present embodiment, two lines of the pressure chambers 19 are formed in the Y direction in correspondence with the two nozzle lines. After the pressure chamber substrate 20 is bonded while being positioned with respect to the communication plate 16 described later, one end portion in the X direction of each pressure chamber 19 is in communication with the individual communication hole 40 of the communication plate 16 described later. In addition, the other end portion in the X direction of the pressure chamber 19 is in communication with the nozzle communication hole 41 of the communication plate 16.

On an upper surface 20A of the pressure chamber substrate 20, that is, a surface on a side opposite to a lower surface 20B, which is a bonding surface with the communication plate 16, the diaphragm 21 that functions as a vibration plate is formed while sealing the upper end side opening of the pressure chamber 19. This means that the diaphragm 21 forms a top surface portion of the pressure chamber 19. The diaphragm 21 is configured by, for example, silicon dioxide having a thickness of approximately 1 μm. The upper surface 20A of the pressure chamber substrate 20 corresponds to a first surface, and the lower surface 20B of the pressure chamber substrate 20 corresponds to a second surface.

In addition, on the diaphragm 21, the piezoelectric element 22 is formed via an insulating film (not illustrated). The piezoelectric element 22 of the present embodiment is the piezoelectric element 22 in a so-called flexure mode, and after an individual electrode as a first electrode, a piezoelectric body laminate, and a common electrode film as a second electrode (none of which is illustrated) are sequentially laminated, the piezoelectric element 22 is patterned for each pressure chamber 19. In addition, as illustrated in FIG. 3B, an active portion 35, of the piezoelectric element 22, in which the piezoelectric body laminate is pinched between the individual electrode and the common electrode film, is formed slightly smaller than the upper end side opening of pressure chamber substrate 20 in plan view. The diaphragm 21 formed in a region overlapping with the upper end side opening of the pressure chamber substrate 20, and the like function as an vibrating portion 37 that is displaced when the piezoelectric element 22 is driven. Note that from the individual electrode of each piezoelectric element 22, electrode wiring portions (not illustrated) extend on the insulating film, and portions corresponding to electrode terminals of the electrode wiring portions are coupled to terminals on one end side of the head cable. Each piezoelectric element 22 is bent and deformed as a control signal is applied between the individual electrode and the common electrode film through the head cable from a control unit (not illustrated). In addition, on the upper surface 20A of the pressure chamber substrate 20 on which the piezoelectric element 22 is formed, as illustrated in FIG. 2, the protection substrate 23 is disposed. The protection substrate 23 is a hollow box-shaped member opening on the lower surface side and is manufactured from a silicon single crystal substrate, metal, a synthetic resin, and the like. The piezoelectric element 22 is accommodated in the protection substrate 23.

The pressure chamber 19 is made by performing etching on the pressure chamber substrate 20 made of a silicon single crystal substrate, whose surface is a (110) plane, from the side of the lower surface 20B, which is the bonding surface with the communication plate 16, so as to penetrate a plate thickness. In the pressure chamber substrate 20, a wall surface portion defining the pressure chamber 19 is formed of a crystal orientation plane made of a (111) plane. In the present embodiment, as illustrated in FIG. 3B, in plan view, the outer edge of the pressure chamber 19 is formed into a parallelogram in which the X direction is a longitudinal direction. This means that in the bottom surface portion of the pressure chamber 19, that is, on the lower surface 20B side of the pressure chamber substrate 20, in one end portion in the X direction, an acute angle portion 30A, in which sides mutually forming the outer edge of the pressure chamber 19 in plan view form an acute angle, is formed, and an obtuse angle portion 31B, in which sides mutually forming the outer edge of the pressure chamber 19 form an obtuse angle, is formed. In addition, in the bottom surface portion of the pressure chamber 19, in another end portion in the X direction, an acute angle portion 30B, in which sides mutually forming the outer edge of the pressure chamber 19 in plan view form an acute angle, is formed, and an obtuse angle portion 31A, in which sides mutually forming the outer edge of the pressure chamber 19 form an obtuse angle, is formed. The acute angle portion 30A corresponds to a first acute angle portion, and the acute angle portion 30B corresponds to a second acute angle portion. Here, the acute angle portion 30A, the acute angle portion 30B, the obtuse angle portion 31A, and the obtuse angle portion 31B are all vertexes of the parallelogram formed by the outer edge of the pressure chamber 19. Therefore, the acute angle portion 30A, the acute angle portion 30B, the obtuse angle portion 31A, and the obtuse angle portion 31B are the point and have substantially no area.

As illustrated in FIG. 3B, the pressure chamber 19 has an vibrating section 62 whose position in the X direction is the same as the position of the active portion 35, and in addition, has a supply section 61 adjacent to one end of the vibrating section 62 in the X direction and including the acute angle portion 30A, and a discharge section 63 adjacent to another end of the vibrating section 62 in the X direction and including the acute angle portion 30B. In addition, the pressure chamber 19 has a boundary portion formed between a wall surface portion parallel to the X direction and the Z direction and an inclined surface 33 formed of a (111) plane and a boundary portion formed between a wall surface portion parallel to the X direction and the Z direction and the diaphragm 21. Each of the boundary portions extends in the X direction in plan view. Specifically, the pressure chamber 19 has a boundary portion 34A, in which the acute angle portion 30A is a starting point, and the obtuse angle portion 31A is an end point, and a boundary portion 34B, in which the acute angle portion 30B is a starting point, and the obtuse angle portion 31B is an end point. The boundary portion 34A corresponds to a first boundary portion, and the boundary portion 34B corresponds to a second boundary portion.

Moreover, when a virtual straight line that passes through the center of the vibrating section 62 in the Y direction and extends in the X direction is a central line 60, the interval between the boundary portion 34A and the central line 60 in the Y direction does not decrease and is substantially constant from the supply section 61 to the vibrating section 62, that is, within a range from the acute angle portion 30A to the discharge section 63. Similarly, the interval between the boundary portion 34B and the central line 60 in the Y direction does not decrease and is substantially constant from the discharge section 63 to the vibrating section 62, that is, within a range from the acute angle portion 30B to the supply section 61. In addition, the acute angle portion 30A and the acute angle portion 30B are located on a diagonal line of the parallelogram formed by the outer edge of the pressure chamber 19 and provided on mutually opposite sides with respect to the central line 60.

The communication plate 16, which is a constituting member of the flow path unit 14, is a substrate pinched between the pressure chamber substrate 20 and the nozzle plate 15. This means that the pressure chamber substrate 20 is bonded on an upper surface 16A side of the communication plate 16, and the nozzle plate 15 is bonded on a lower surface 16B side of the communication plate 16. In this manner, the communication plate 16 is provided on the lower surface 20B side of the pressure chamber substrate 20 and forms the bottom surface portion of the pressure chamber 19. A liquid adhesive is used for bonding of these substrates. Note that the upper surface 16A of the communication plate 16, which is bonded together with the lower surface 20B of the pressure chamber substrate 20, corresponds to a third surface. The communication plate 16 of the present embodiment is made by performing etching on a silicon single crystal substrate whose surface is formed of a (110) plane. In the communication plate 16, the common liquid chamber 39, the individual communication hole 40, and the nozzle communication hole 41 are formed. In addition, the individual communication hole 40 also has a function as a flow path resistance portion for improving efficiency when ink is ejected from each nozzle 45, and the flow path resistance value is adjusted according to the opening area and the length in the Z direction of the individual communication hole 40.

As illustrated in FIG. 2, the individual communication hole 40 and the nozzle communication hole 41 are flow paths penetrating the communication plate 16 in the Z direction, which is the plate thickness direction of the communication plate 16, and are in communication with each end portion in the X direction of the pressure chamber 19. The upper end of the individual communication hole 40 is coupled to one end side in the X direction of the pressure chamber 19, specifically an end portion on a side away from the central line 12. The lower end of the individual communication hole 40 is coupled to the common liquid chamber 39. The common liquid chamber 39 is a series of hollow portions formed in the nozzle line direction and is formed for each nozzle line on the outer edge side in the X direction of the communication plate 16. The common liquid chamber 39 extends from the outer edge side in the X direction toward the central line 12 side. Specifically, the common liquid chamber 39 extends to a portion below the pressure chamber 19 while recessing the communication plate 16 from the lower surface 16B to the middle in the Z direction and leaving a thin portion 42 on the upper surface 16A side. In the thin portion 42 of the communication plate 16, the individual communication hole 40 penetrating the communication plate 16 in the Z direction opens. By the individual communication hole 40, the ink of the common liquid chamber 39 is supplied to the pressure chamber 19.

In addition, the upper end of the nozzle communication hole 41 is coupled to the other end side in the X direction of the pressure chamber 19, specifically the end portion on the central line 12 side. The lower end of the nozzle communication hole 41 is coupled to the nozzle 45. This means that the nozzle communication hole 41 is in communication with the nozzle 45 and guides the ink in the pressure chamber 19 to the nozzle 45. Note that as illustrated in FIG. 3B, hereinafter, the opening on the upper end side of the individual communication hole 40 is referred to as a supply opening 43, and the opening on the upper end side of the nozzle communication hole 41 is referred to as a discharge opening 44. This means that the supply opening 43 and the discharge opening 44 are provided on the upper surface 16A of the communication plate 16. In plan view, the supply opening 43 overlaps with a part of the supply section 61, and the discharge opening 44 overlaps with a part of the discharge section 63.

In the present embodiment, since the communication plate 16 is formed by performing etching on a silicon single crystal substrate whose surface is a (110) plane, wall surface portions defining the individual communication hole 40 and the nozzle communication hole 41 are formed of crystal orientation planes made of (111) planes. This means that the supply opening 43 and the discharge opening 44 each are formed into a parallelogram in plan view. In addition, the supply opening 43 and the discharge opening 44 of the present embodiment are formed so as to have a narrower width in the Y axis direction than the outer edge of the pressure chamber 19 on the lower surface 20B of the pressure chamber substrate 20, and in plan view, each end portion in the Y direction is disposed on an inner side of the outer edge of the pressure chamber 19. This means that in plan view, the supply opening 43 and the discharge opening 44 do not overlap with the outer edge of the pressure chamber 19 on the lower surface 20B of the pressure chamber substrate 20.

Moreover, on the upper surface 16A of the communication plate 16, the supply opening 43 and the discharge opening 44 are disposed so as not to overlap, in plan view, with the acute angle portions 30A and 30B formed on each end in the X direction of the pressure chamber 19. Specifically, as illustrated in FIG. 3B, in plan view, the supply opening 43 of the individual communication hole 40 is disposed at a position not overlapping with the acute angle portion 30A on the one end side in the X direction of the pressure chamber 19. In addition, the discharge opening 44 of the nozzle communication hole 41 is disposed at a position not overlapping with the acute angle portion 30B on the other end side in the X direction of the pressure chamber 19. In other words, each of the acute angle portion 30A and the acute angle portion 30B does not overlap with the supply opening 43 or the discharge opening 44 in plan view.

The nozzle plate 15 is a plate member formed of a silicon single crystal substrate and the like on which a plurality of the nozzles 45 is opened and provided in lines with a pitch corresponding to a dot formation density. In the present embodiment, the nozzle lines are configured by arranging 360 nozzles 45 with a pitch corresponding to 360 dpi. In addition, in the present embodiment, two nozzle lines are formed in the Y direction on the nozzle plate 15.

In the recording head 3 having such a configuration, by capturing ink from the ink cartridge 7 through the ink introduction path 28, a flow path such as the common liquid chamber 39 and the pressure chamber 19 in the recording head 3 is filled with ink. In addition, by supplying a control signal from the control unit to the piezoelectric element 22, the piezoelectric element 22 is bent. Accordingly, the vibrating portion 37 of the diaphragm 21 is displaced, and a pressure change is generated in the ink in the pressure chamber 19. The pressure change causes the ink in the pressure chamber 19 to be ejected from each nozzle 45 via the nozzle communication hole 41.

Figure 4A:
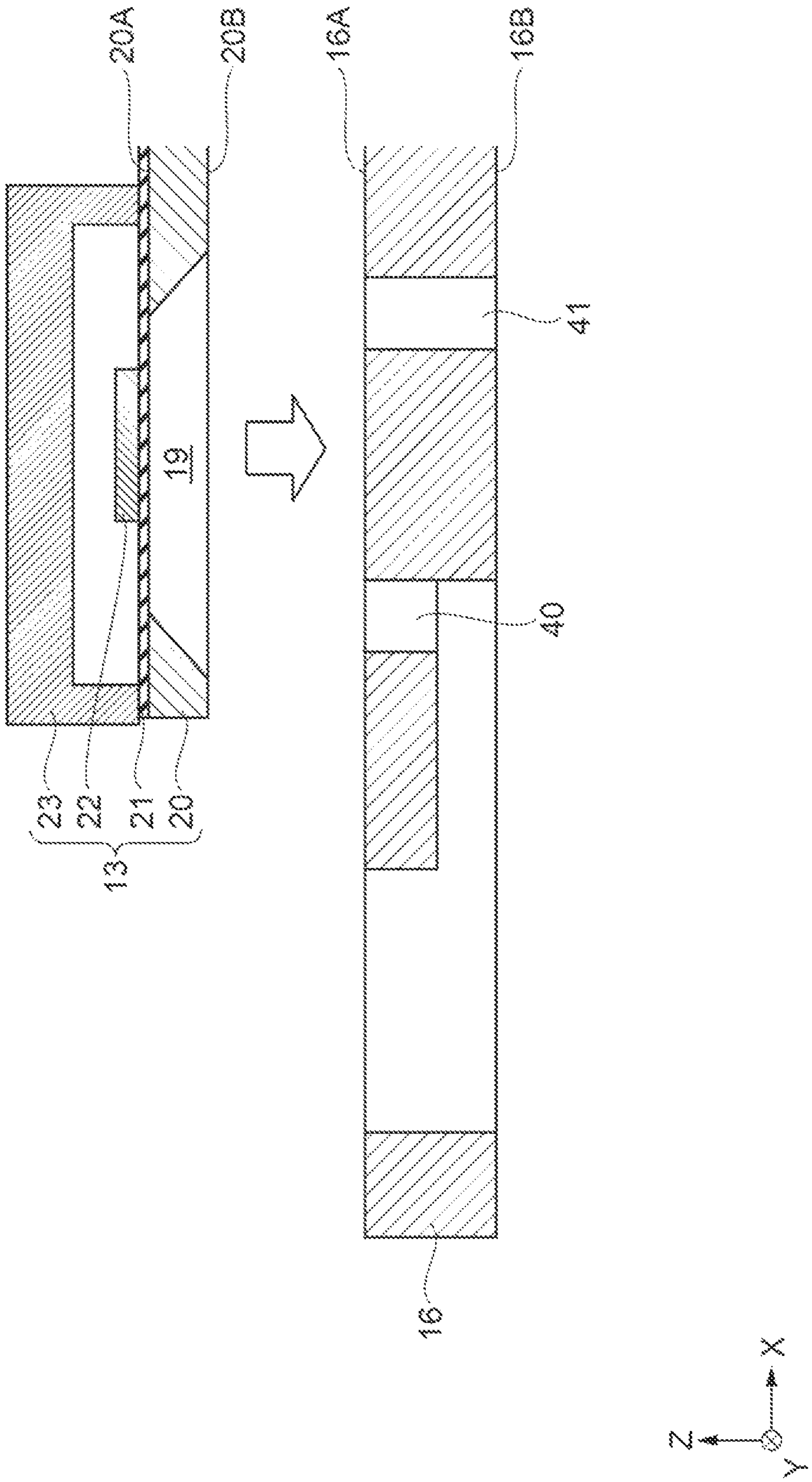
FIG. 4A is a cross sectional view explaining a manufacturing process of the recording head.
Figure 4B:
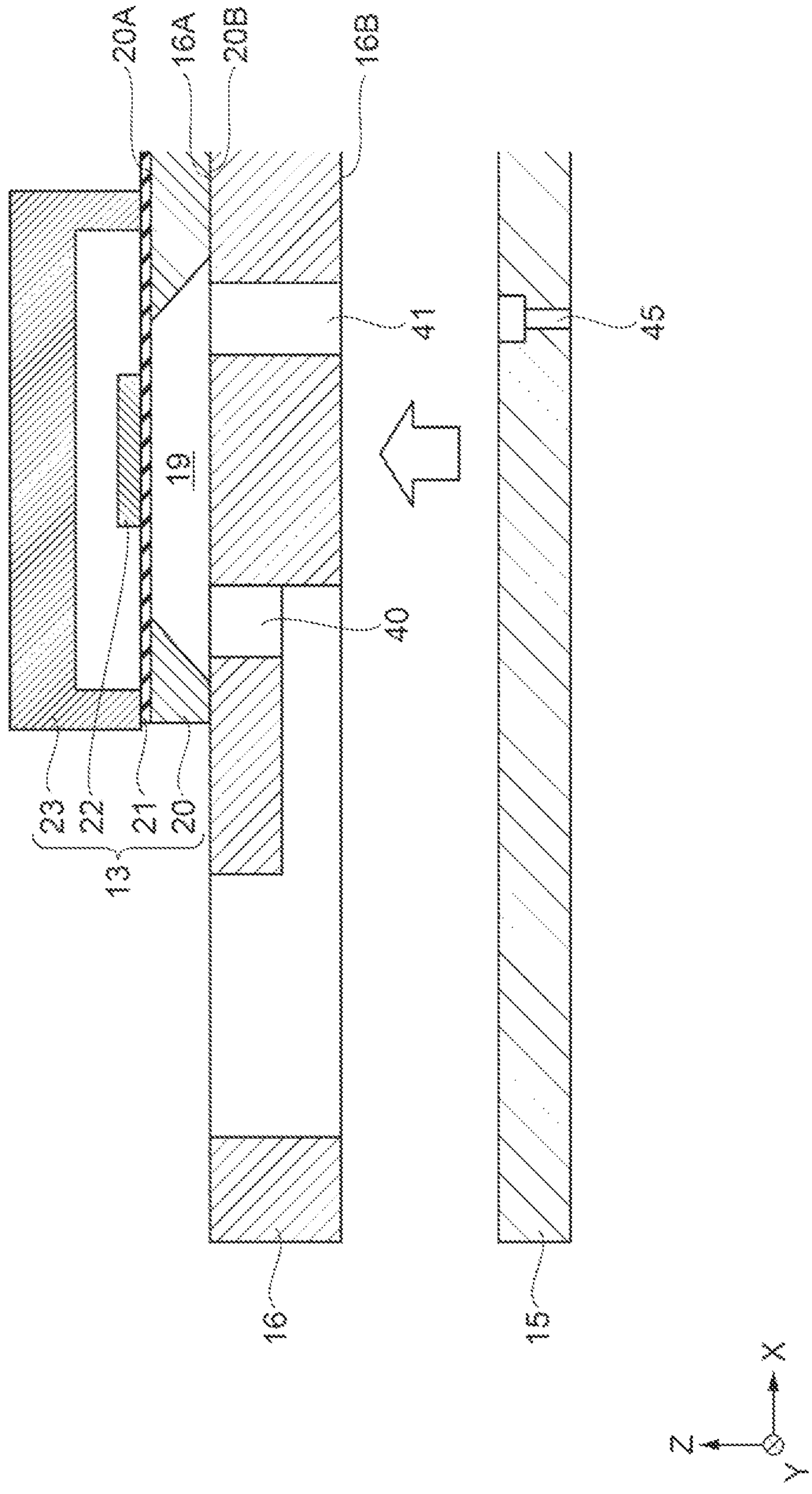
FIG. 4B is a cross sectional view explaining the manufacturing process of the recording head.

Next, a manufacturing method of the recording head 3 will be described. In particular, a bonding process of the pressure chamber substrate 20 and the communication plate 16 will be described in detail. FIG. 4A and FIG. 4B are cross sectional views for explaining the manufacturing process of the recording head 3.

The pressure chamber substrate 20, the communication plate 16, the nozzle plate 15, and the like are manufactured by performing etching on a silicon wafer using a prescribed mask pattern and cutting the silicon wafer into individual substrates. In addition, as illustrated in FIG. 4A, on the upper surface 20A of the pressure chamber substrate 20 formed as described above, the diaphragm 21, the piezoelectric element 22, and the protection substrate 23 are laminated so as to manufacture the pressure generating unit 13.

Next, the nozzle plate 15, the communication plate 16, and the pressure generating unit 13 are bonded together using a liquid adhesive. Note that an instant adhesive, a UV adhesive, and the like are used for the adhesive. First, the adhesive is substantially uniformly applied, by an application method such as transferring, to a portion, of the upper surface 16A of the communication plate 16, corresponding to the pressure generating unit 13. In this state, as illustrated in FIG. 4A, the lower surface of the pressure generating unit 13, that is, the lower surface 20B of the pressure chamber substrate 20 is pressed against the upper surface 16A of the communication plate 16 and is bonded. At this time, the adhesive escaping from the bonding surface between the communication plate 16 and the pressure chamber substrate 20 advances by a capillary force, from the acute angle portions 30A and 30B of the pressure chamber 19 as the starting points, along the boundary portions 34A and 34B, respectively, to the upper surface 20A side of the pressure chamber substrate 20. Specifically, as illustrated in FIG. 3B, the adhesive advances, from the acute angle portion 30A of the supply section 61, along the boundary portion 34A, toward the vibrating section 62 and the discharge section 63, and the adhesive advances, from the acute angle portion 30B of the discharge section 63, along the boundary portion 34B, toward the vibrating section 62 and the supply section 61.

Next, the adhesive is substantially uniformly applied to the entire surface of the lower surface 16B of the communication plate 16. In this state, as illustrated in FIG. 4B, the nozzle plate 15 is pressed against the lower surface 16B of the communication plate 16 and is bonded.

Finally, as illustrated in FIG. 2, the case 18 is bonded to the upper surface 16A of the communication plate 16 using an adhesive and the like so that the pressure generating unit 13 is accommodated in the accommodating hollow portion 27. In this manner, the recording head 3 described above can be made.

As described above, in the present embodiment, since, in plan view, the supply opening 43 of the individual communication hole 40 and the discharge opening 44 of the nozzle communication hole 41 are formed so as not to overlap with the acute angle portions 30A and 30B of the pressure chamber 19, respectively, the adhesive that has escaped from the acute angle portions 30A and 30B as the starting points flows along the boundary portions 34A and 34B. This means that the escaped adhesive is suppressed from flowing to the individual communication hole 40 and the nozzle communication hole 41, and the flow paths are limited to being inside the pressure chamber 19. Accordingly, the amount of adhesive flowing in the boundary portions 34A and 34B becomes stable, and the amount of adhesive attached to the peripheral portion of vibrating section 62 is made uniform on each side in the Y direction. As a result, even when stress is applied to the boundary portions 34A and 34B of the vibrating section 62 as the piezoelectric element 22 is bent and deformed, since the amount of adhesive is uniform, the load on the boundary portions 34A and 34B of the vibrating section 62 is dispersed. This means that when the piezoelectric element 22 is driven, the load is unlikely to concentrate on a part of the diaphragm 21, and the diaphragm 21 can be suppressed from being destroyed. On the other hand, in a case where the supply opening 43 of the individual communication hole 40 and the discharge opening 44 of the nozzle communication hole 41 are formed so as to overlap with the acute angle portions 30A and 30B of the pressure chamber 19 in plan view, respectively, the adhesive that has escaped from the acute angle portions 30A and 30B as the starting points flows along the boundary portions 34A and 34B and flows into the individual communication hole 40 and the nozzle communication hole 41. This means that the amount of adhesive flowing in the boundary portions 34A and 34B becomes unstable, and the amount of adhesive attached to the peripheral portion of the vibrating section 62 is likely to be non-uniform on each side in the Y direction. In such a case, compared to the present embodiment, when the piezoelectric element 22 is driven, the load is likely to concentrate on the diaphragm 21, and the diaphragm 21 may not be suppressed from being destroyed.

In addition, since the supply opening 43 and the discharge opening 44 are formed so as not to overlap with the outer edge of the pressure chamber 19 in plan view, the entire portions of the supply opening 43 and the discharge opening 44 are located in the opening portion of the pressure chamber 19. This means that the supply opening 43 and the discharge opening 44 are not adjacent to a region, of the upper surface 16A of the communication plate 16, that is bonded to the lower surface 20B of the pressure chamber substrate 20. Accordingly, since acute angle portions formed in the supply opening 43 and the discharge opening 44 do not become the starting points of entry of the adhesive, the adhesive is further suppressed from flowing into the individual communication hole 40 and the nozzle communication hole 41. As a result, the amount of adhesive flowing in the boundary portions 34A and 34B can be further stabilized.

In addition, since the acute angle portions 30A and 30B, which are the two starting points of the capillary force, are formed on mutually opposite sides with respect to the central line 60 in plan view, the amount of adhesive attached to each side in the Y direction of the vibrating portion 37 can be made further uniform. This is because, in the obtuse angle portions 31A and 31B, the capillary force is less likely to act, compared to the acute angle portions 30A and 30B, and the amount of adhesive that advances, from the obtuse angle portions 31A and 31B as the starting points, along the boundary portions 34A and 34B by the capillary force, respectively, to the upper surface 20A side of the pressure chamber substrate 20 may be less than the amount of adhesive that advances from the acute angle portions 30A and 30B as the starting points.

In addition, since the interval in the Y direction between the boundary portion 34A and the central line 60 does not decrease from the acute angle portion 30A to the vibrating section 62, and the interval in the Y direction between the boundary portion 34B and the central line 60 does not decrease from the acute angle portion 30B to the vibrating section 62, the flow path of the adhesive does not become complicated, and the adhesive can be suppressed from staying in the middle of the path.

In addition, since the active portion 35 of the piezoelectric element 22 is not disposed in the supply section 61, in which the acute angle portion 30A is formed, and the discharge section 63, in which the acute angle portion 30B is formed, even if the adhesive stays in the acute angle portions 30A and 30B, the adhesive can be suppressed from affecting vibration of the vibrating portion 37.

In the above-described embodiment, various modifications can be made based on the description of the scope of claims.

For example, in the above-described embodiment, the individual communication hole 40 functions as a flow path resistance portion by adjusting the opening area and the length of the individual communication hole 40 in the Z direction, but the configuration of the flow path resistance portion is not limited thereto. In a second embodiment illustrated in FIG. 5, constricted portions 57A and 57B, whose widths in the Y direction are narrow compared to the vibrating section 62, are formed in each end portion of the supply section 61 and the discharge section 63, respectively. This means that the interval in the Y direction between the boundary portion 34A and the central line 60 increases, in the supply section 61, as approaching the vibrating section 62 from the acute angle portion 30A and becomes equal to the interval in the vibrating section 62. In addition, the interval in the Y direction between the boundary portion 34B and the central line 60 increases, in the discharge section 63, as approaching the vibrating section 62 from the acute angle portion 30B and becomes equal to the interval in the vibrating section 62.

In addition, the interval in the Y direction between the boundary portion 34A of the constricted portion 57A and the central line 60 is equal to the interval in the Y direction between the boundary portion 34B of the constricted portion 57B and the central line 60. This means that the increase in width of the interval in the Y direction between the boundary portion 34A and the central line 60 in the supply section 61 is equal to the interval in the Y direction between the boundary portion 34B and the central line 60 in the discharge section 63. By so doing, the flow path resistance value can be adjusted by the length in the X direction of the constricted portion 57A without making shapes of the boundary portions 34A and 34B so complicated. As a result, the adhesive attached to the vibrating section 62 can be made uniform, and as described in the first embodiment, the load caused by bending and deformation of the piezoelectric element 22 on the boundary portions 34A and 34B of the vibrating section 62 is dispersed, and the diaphragm 21 can be suppressed from being destroyed. Furthermore, larger flow path resistance can be held.

Figure 5:
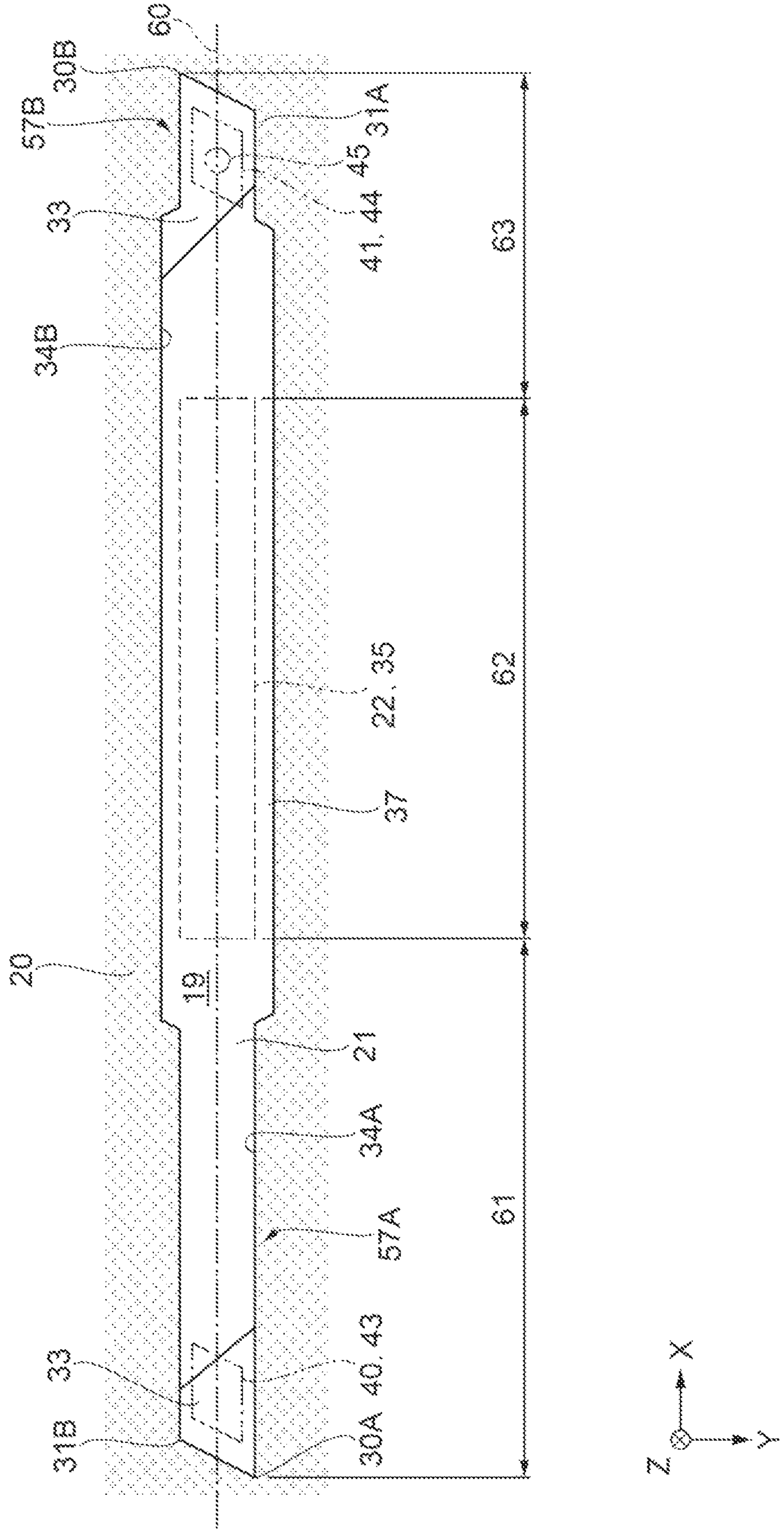
FIG. 5 is a bottom view enlarging a main part of a pressure chamber substrate in a second embodiment.

Note that in FIG. 5 illustrates a case in which the interval in the Y direction between the boundary portion 34B of the constricted portion 57A and the central line 60 is decreased compared to the vibrating section 62, but the present disclosure is not limited thereto. The interval in the Y direction in the constricted portion 57A between the boundary portion 34B and the central line 60 may be decreased so as to become an arbitrary interval, or does not have to be decreased. In addition, the same applies to the interval in the Y direction in the constricted portion 57B between the boundary portion 34A and the central line 60. Since other configurations are the same as those of the above-described embodiment, descriptions will be omitted.

Figure 6A:
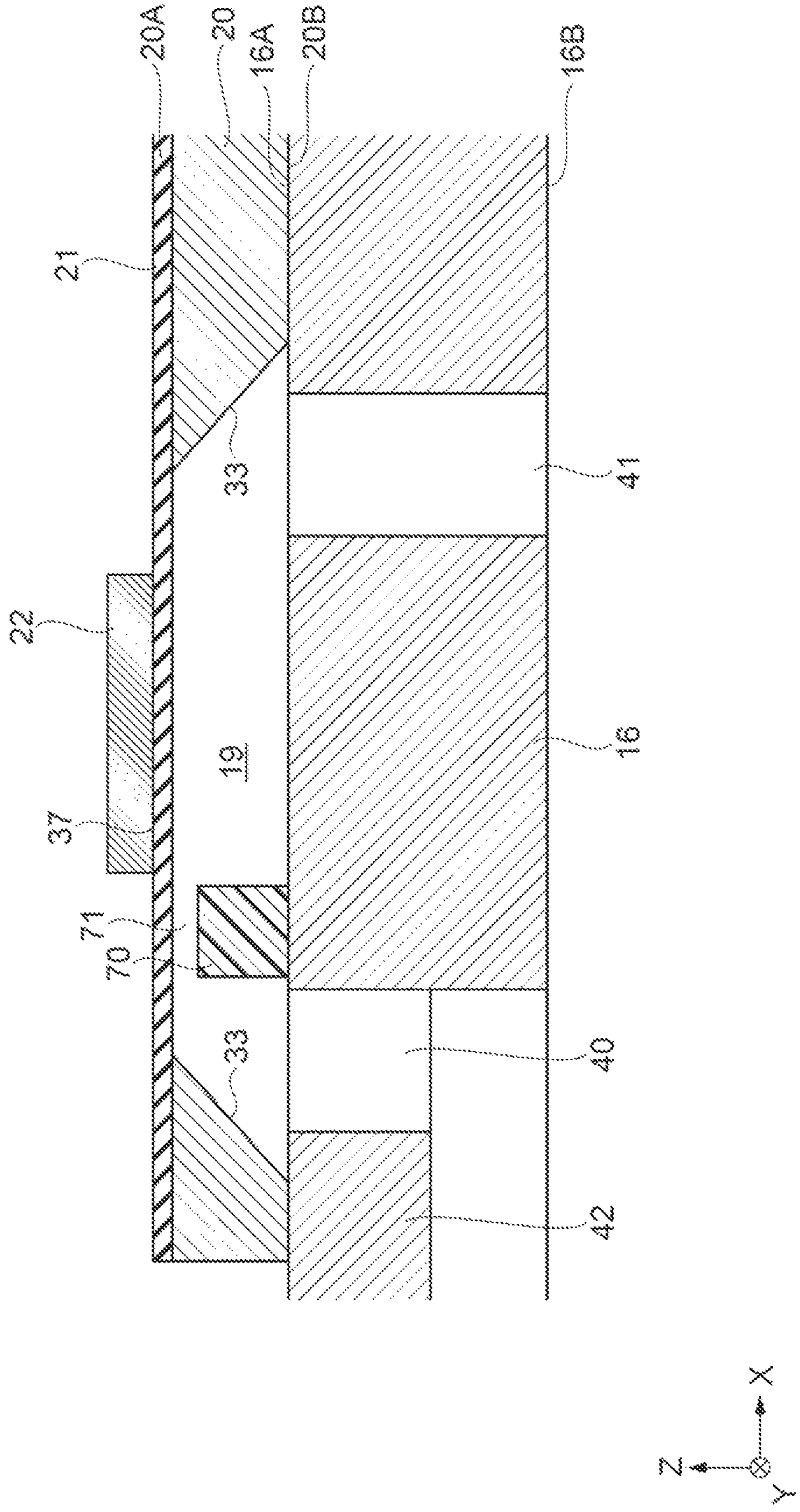
FIG. 6A is a cross sectional view enlarging a main part of a recording head in a third embodiment.
Figure 6B:
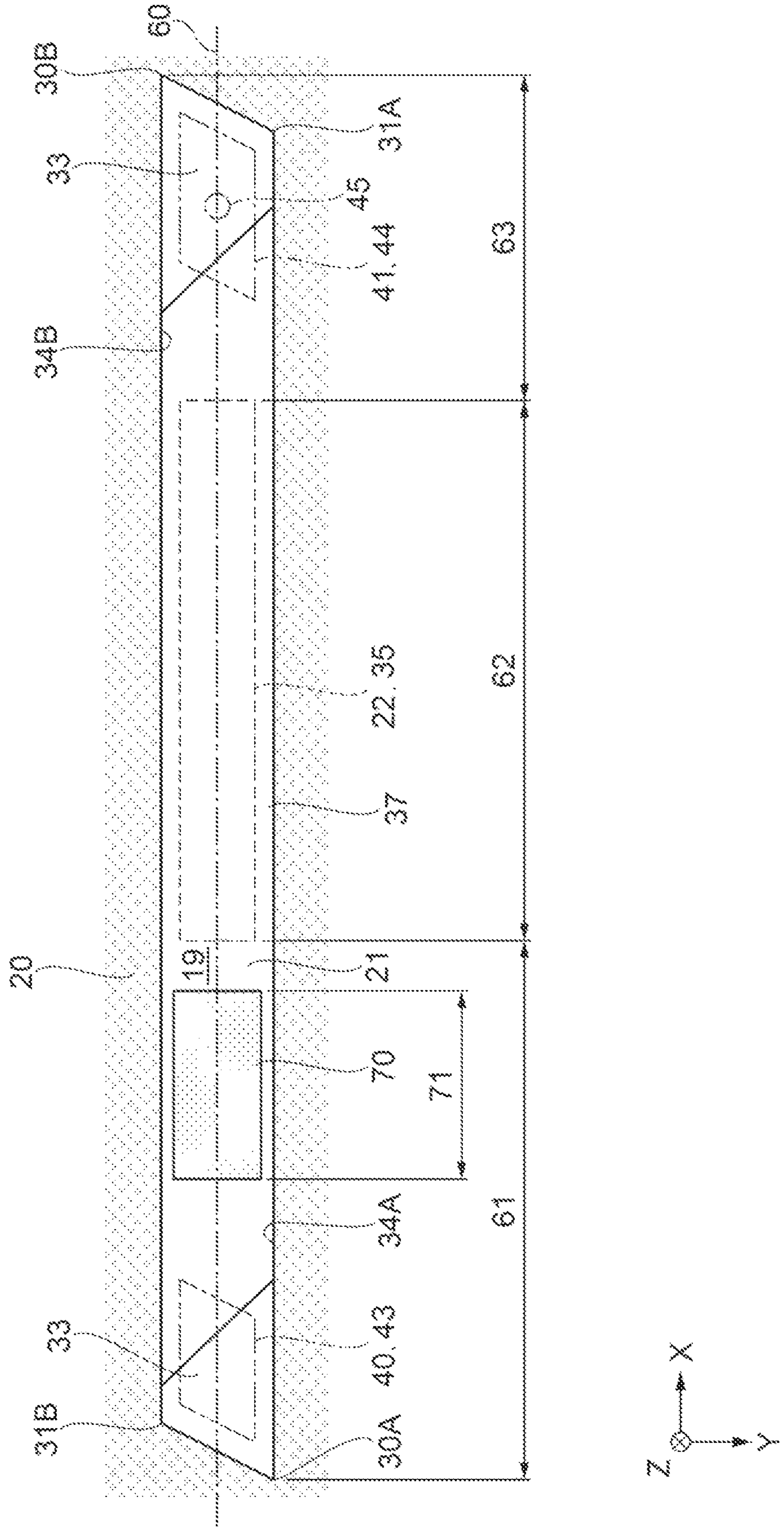
FIG. 6B is a bottom view enlarging a main part of a pressure chamber substrate in the third embodiment.

In addition, in the above-described embodiment, the individual communication hole 40 and the constricted portion 57A have a function as a flow path resistance portion, but the present disclosure is not limited thereto. In a third embodiment illustrated in FIGS. 6A to 6C, a protrusion 70 is provided on the upper surface 16A of the communication plate 16, and the protrusion 70 reduces the width of a portion of the pressure chamber 19 in the Z direction to form a flow path resistance portion 71. The protrusion 70 and the flow path resistance portion 71 are disposed between the supply opening 43 and the vibrating section 62. The protrusion 70 is formed by performing etching on a photoresist applied to the upper surface 16A after formation of the communication plate 16.

Figure 6C:
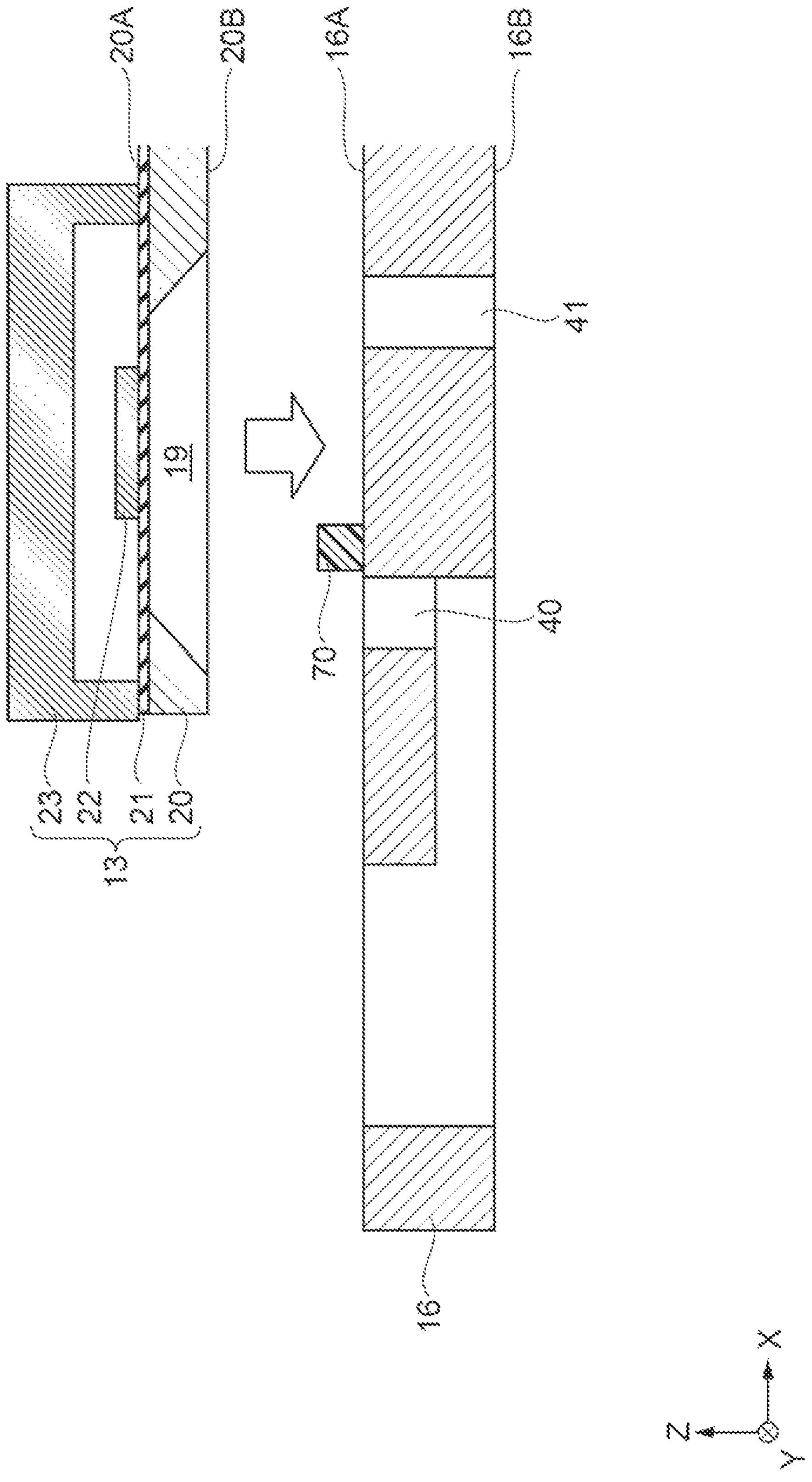
FIG. 6C is a cross sectional view explaining a manufacturing process of the recording head in the third embodiment.

Thereafter, as illustrated in FIG. 6C, the lower surface 20B of the pressure chamber substrate 20 is pressed against the upper surface 16A of the communication plate 16 and bonded. At this time, although the adhesive that has escaped into the pressure chamber 19 advances, by the capillary force, from the acute angle portions 30A and 30B at each end of the pressure chamber 19 as the starting portions, along the boundary portions 34A and 34B, respectively, to the upper surface 20A side of the pressure chamber substrate 20, since the protrusion 70 does not interfere with the boundary portions 34A and 34B, the protrusion 70 does not hinder the flow of the adhesive. Accordingly, the amount of adhesive attached to the peripheral portion of the vibrating section 62 is made uniform. As a result, as described in the first embodiment, the load caused by bending and deformation of the piezoelectric element 22 on the boundary portions 34A and 34B of the vibrating section 62 is dispersed, and the diaphragm 21 can be suppressed from being destroyed. Moreover, since the flow path resistance value of the flow path resistance portion 71 is mostly determined by the height in the Z direction of the protrusion 70, by changing the application thickness of the above-described photoresist, the height of the protrusion 70 can be changed, and the resistance value of the flow path resistance portion 71 can be easily changed. In other words, by simply adding a process for forming the protrusion 70 on the communication plate 16 and changing the thickness of the photoresist to be applied, various flow path resistance values can be achieved. Note that in the present embodiment, the material of the protrusion 70 is a photoresist, but other photosensitive resin materials may be used. Alternatively, the same material as the base material of the communication plate 16 may be used, or a material different from the base material of the communication plate 16 may be used for formation of the protrusion 70.

In addition, in the above description, the ink jet type recording head 3, which is a type of a liquid ejecting head, is exemplified, but the present disclosure can be applied to a liquid ejecting head that ejects a liquid other than ink. For example, the present disclosure can be applied to a color material ejecting head used for manufacturing a color filter of a liquid crystal display and the like, an electrode material ejecting head used for forming an electrode of an organic electro luminescence (EL) display, a field emission display (FED) (surface emission display), and the like, a bioorganic substance ejecting head used for manufacturing a biochip, and the like.

What is claimed is:

1. A liquid ejecting head comprising:

a pressure chamber substrate in which wall surface portions of a pressure chamber in communication with a nozzle are formed;

an diaphragm that is provided on a first surface side of the pressure chamber substrate in a laminating direction and forms a top surface portion of the pressure chamber;

a piezoelectric element that is provided on the diaphragm; and a communication plate that is provided on a second surface side opposite to the first surface of the pressure chamber substrate in the laminating direction and forms a bottom surface portion of the pressure chamber, wherein a third surface of the communication plate is bonded to the second surface of the pressure chamber substrate by an adhesive and forms the bottom surface portion, the third surface is provided with a supply opening that supplies a liquid to the pressure chamber and a discharge opening that guides a liquid in the pressure chamber to the nozzle, the pressure chamber is longitudinal in a first direction when viewed in the laminating direction, at one end of the bottom surface portion in the first direction, a first acute angle portion is formed by the wall surface portions that mutually form an acute angle, at another end of the bottom surface portion in the first direction, a second acute angle portion is formed by the wall surface portions that mutually form an acute angle, the first acute angle portion does not overlap with the supply opening and the discharge opening when viewed in the laminating direction, the second acute angle portion does not overlap with the supply opening and the discharge opening when viewed in the laminating direction, the piezoelectric element has an active portion in which a piezoelectric body laminate is sandwiched between a first electrode and a second electrode, when a section, of the pressure chamber, whose position in the first direction is same as a position of the active portion is a vibrating section, a direction that intersects with the laminating direction and the first direction is a second direction, a virtual straight line that passes through a center in the second direction in the vibrating section and extends in the first direction is a central line, and the first acute angle portion and the second acute angle portion are provided on mutually opposite sides with respect to the central line when viewed in the laminating direction, the pressure chamber has the vibrating section, a supply section, and a discharge section, the supply section includes the first acute angle portion and is adjacent to one end of the vibrating section in the first direction, a part of the supply section overlapping with the supply opening in the laminating direction, the discharge section includes the second acute angle portion and is adjacent to another end of the vibrating section in the first direction, a part of the discharge section overlapping with the discharge opening in the laminating direction, the pressure chamber has a first boundary portion that extends in the first direction from the first acute angle portion as a starting point along a boundary between one of the wall surface portions and the top surface portion, and a second boundary portion that extends in the first direction from the second acute angle portion as a starting point along a boundary between one of the wall surface portions and the top surface portion, and when viewed in the laminating direction, an interval in the second direction between the central line and the first boundary portion increases as approaching from the first acute angle portion to the vibrating section, in the supply section, and an interval in the second direction between the central line and the second boundary portion increases as approaching from the second acute angle portion to the vibrating section, in the discharge section.

2. The liquid ejecting head according to claim 1, wherein when viewed in the laminating direction, an outer edge of the pressure chamber on the second surface of the pressure chamber substrate does not overlap with the supply opening and the discharge opening.

3. The liquid ejecting head according to claim 1, wherein when viewed in the laminating direction, an interval in the second direction between the central line and the first boundary portion does not decrease from the supply section to the vibrating section, and an interval in the second direction between the central line and the second boundary portion does not decrease from the discharge section to the vibrating section.

4. The liquid ejecting head according to claim 1, wherein when viewed in the laminating direction, an increase in width of an interval in the second direction between the central line and the first boundary portion in the supply section is equal to an increase in width of an interval in the second direction between the central line and the second boundary portion in the discharge section.

5. A liquid ejecting apparatus comprising:

the liquid ejecting head according to claim 1; and a liquid supply source storing a liquid supplied to the liquid ejecting head.

6. The liquid ejecting head according to claim 1, wherein a thickness of the pressure chamber substrate in the laminating direction is thinner than a thickness of the communication plate in the laminating direction.

7. A liquid ejecting head comprising:

a pressure chamber substrate in which wall surface portions of a first pressure chamber in communication with a nozzle are formed;

an diaphragm that is provided on a first surface side of the pressure chamber substrate in a laminating direction and forms a top surface portion of the first pressure chamber;

a piezoelectric element that is provided on the diaphragm; and a communication plate that is provided on a second surface side opposite to the first surface of the pressure chamber substrate in the laminating direction and forms a bottom surface portion of the first pressure chamber, wherein a third surface of the communication plate is bonded to the second surface of the pressure chamber substrate by an adhesive and forms the bottom surface portion, the third surface is provided with a supply opening that supplies a liquid to the first pressure chamber and a discharge opening that guides a liquid in the first pressure chamber to the nozzle, the first pressure chamber is longitudinal in a first direction when viewed in the laminating direction, at one end of the bottom surface portion in the first direction, a first acute angle portion is formed by the wall surface portions that mutually form an acute angle, at another end of the bottom surface portion in the first direction, a second acute angle portion is formed by the wall surface portions that mutually form an acute angle, the first acute angle portion does not overlap with the supply opening and the discharge opening when viewed in the laminating direction, the second acute angle portion does not overlap with the supply opening and the discharge opening when viewed in the laminating direction, the piezoelectric element has an active portion in which a piezoelectric body laminate is sandwiched between a first electrode and a second electrode, when a section, of the first pressure chamber, whose position in the first direction is same as a position of the active portion is an vibrating section, the supply opening opens in the laminating direction, and when viewed in the laminating direction, between the supply opening and the vibrating section, a flow path resistance portion that reduces a width of the pressure chamber in the laminating direction is formed.

8. The liquid ejecting head according to claim 7, wherein the flow path resistance portion is formed by providing a protrusion on the communication plate.

9. The liquid ejecting head according to claim 8, wherein the protrusion is formed by a photoresist.

10. The liquid ejecting head according to claim 8, wherein the protrusion protrudes from the bottom surface portion toward the diaphragm along the laminating direction so as to form a gap between the diaphragm and the protrusion in the laminating direction.

11. The liquid ejecting head according to claim 7, wherein when viewed in the laminating direction, an outer edge of the first pressure chamber on the second surface of the pressure chamber substrate does not overlap with the flow path resistance portion.

12. The liquid ejecting head according to claim 7, wherein when viewed in the laminating direction, the vibrating section does not overlap with the flow path resistance portion.

13. The liquid ejecting head according to claim 7, wherein a direction that intersects with the laminating direction and the first direction is a second direction, a virtual straight line that passes through a center in the second direction in the vibrating section and extends in the first direction is a central line, and the first acute angle portion and the second acute angle portion are provided on mutually opposite sides with respect to the central line when viewed in the laminating direction.

14. The liquid ejecting head according to claim 7, further comprising:

a plurality of individual flow paths including respectively a plurality of pressure chambers, the first pressure chamber being one of the plurality of pressure chambers; and a common liquid chamber communicating with the plurality of individual flow paths, wherein the supply opening is provided in the individual flow path including the first pressure chamber.

15. A liquid ejecting apparatus comprising:

the liquid ejecting head according to claim 7; and a liquid supply source storing a liquid supplied to the liquid ejecting head.

16. A liquid ejecting head comprising:

a pressure chamber substrate in which wall surface portions of a pressure chamber in communication with a nozzle are formed;

an diaphragm that is provided on a first surface side of the pressure chamber substrate in a laminating direction and forms a top surface portion of the pressure chamber;

a piezoelectric element that is provided on the diaphragm; and a communication plate that is provided on a second surface side opposite to the first surface of the pressure chamber substrate in the laminating direction and forms a bottom surface portion of the pressure chamber, wherein a third surface of the communication plate is bonded to the second surface of the pressure chamber substrate by an adhesive and forms the bottom surface portion, the third surface is provided with a supply opening that supplies a liquid to the pressure chamber and a discharge opening that guides a liquid in the pressure chamber to the nozzle, the pressure chamber is longitudinal in a first direction when viewed in the laminating direction, at one end of the bottom surface portion in the first direction, a first acute angle portion is formed by the wall surface portions that mutually form an acute angle, at another end of the bottom surface portion in the first direction, a second acute angle portion is formed by the wall surface portions that mutually form an acute angle, the first acute angle portion does not overlap with the supply opening and the discharge opening when viewed in the laminating direction, the second acute angle portion does not overlap with the supply opening and the discharge opening when viewed in the laminating direction, the piezoelectric element has an active portion in which a piezoelectric body laminate is sandwiched between a first electrode and a second electrode, and when a section, of the pressure chamber, whose position in the first direction is same as a position of the active portion is a vibrating section, an interval in the first direction between the first acute angle portion and the vibrating section is longer than a size of the vibrating section in the laminating direction, and an interval in the first direction between the second acute angle portion and the vibrating section is longer than a size of the vibrating section in the laminating direction.

17. The liquid ejecting head according to claim 16, wherein a direction that intersects with the laminating direction and the first direction is a second direction, the interval in the first direction between the first acute angle portion and the vibrating section is longer than a size of the vibrating section in the second direction, and the interval in the first direction between the second acute angle portion and the vibrating section is longer than a size of the vibrating section in the second direction.

18. A liquid ejecting apparatus comprising:

the liquid ejecting head according to claim 16; and a liquid supply source storing a liquid supplied to the liquid ejecting head.

* * * * *